United States Patent
Bruekers

(10) Patent No.: US 6,754,159 B2
(45) Date of Patent: Jun. 22, 2004

(54) REPRODUCTION ARRANGEMENT, TRANSMISSION ARRANGEMENT, METHOD OF FORMING AND TRANSMITTING CODED INFORMATION AND METHOD OF REPRODUCING CODED INFORMATION

(75) Inventor: Alphons Antonius Maria Lambertus Bruekers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 34 days.

(21) Appl. No.: 10/024,736

(22) Filed: Dec. 19, 2001

(65) Prior Publication Data

US 2002/0118621 A1 Aug. 29, 2002

(30) Foreign Application Priority Data

Dec. 22, 2000 (EP) .......................................... 00204803

(51) Int. Cl.[7] .............................................. G11B 7/00
(52) U.S. Cl. ................... 369/59.13; 369/124.14
(58) Field of Search .......................... 369/53.21, 53.22, 369/59.13, 47.1, 124.14, 47.27

(56) References Cited

U.S. PATENT DOCUMENTS 5,535,188 A  *  7/1996  Dang et al. ............... 369/53.21
5,617,384 A  *  4/1997  Yonemitsu et al. ........... 369/32
RE35,839 E  *  7/1998  Asai et al. ..................... 369/47
6,005,839 A     12/1999  Sako et al. .............. 369/275.3

FOREIGN PATENT DOCUMENTS

WO    WO9808180    2/1998
WO    WO0062293    10/2000

* cited by examiner

Primary Examiner—Nabil Hindi
(74) Attorney, Agent, or Firm—Gregory L. Thorne

(57) ABSTRACT

Reproduction arrangement for receiving information coded in accordance with a predefined standard, decoding the coded information and reproducing the decoding result. The reproduction arrangement may further receive and decode trigger information, which differs from the standard in a predefined manner. This results in a predefined special output, which is reproduced by the reproduction arrangement. A manufacturer of hardware and/or software present in the reproduction arrangement may thus verify in a simple manner whether this hardware and/or software has been made by himself. If the predefined special output is reproduced when the trigger information is added, then the reproduction arrangement will contain his hardware and/or software.

11 Claims, 3 Drawing Sheets

REPRODUCTION ARRANGEMENT, TRANSMISSION ARRANGEMENT, METHOD OF FORMING AND TRANSMITTING CODED INFORMATION AND METHOD OF REPRODUCING CODED INFORMATION

FIELD OF THE INVENTION

The invention relates to a reproduction arrangement comprising:

a receiving arrangement provided for receiving information coded according to a predetermined standard, a decoding arrangement provided for decoding the coded information received by the receiving arrangement, so as to form decoded information, a reproduction means provided for reproducing the decoded information.

The invention further relates to a transmission arrangement, a method of forming and transmitting coded information and a method of reproducing coded information.

BACKGROUND OF THE INVENTION

A similar reproduction arrangement is described in "Principles of optical disc systems" by G. Brouwhuis (ISBN 0-85274-785-3), in which particularly the physical and mechanical principles of optical discs and optical disc systems are described. Furthermore, several applications of these systems, such as a Laser Vision video disc system and a Compact Disk digital audio system are described. In such systems the receiving arrangement is provided for reading the information present on the information carrier. The invention, however, is not restricted to such reproduction arrangements with an information carrier, but may also be applied to reproduction arrangements in which the information is supplied, for example, in the form of a signal, the receiving arrangement then being provided for receiving the signal. An example of such a reproduction arrangement is a television receiver with an antenna being provided as a receiving arrangement.

SUMMARY OF THE INVENTION

It is an object of the invention to provide a reproduction arrangement as defined in the opening paragraph with which a producer of hardware and/or software, which is present in the reproduction arrangement, can verify in a simple manner whether this hardware and/or software has been made by the producer himself. For this purpose, the reproduction arrangement according to the invention is characterized in that the reproduction arrangement is further provided for receiving and decoding trigger information which deviates from the standard in a predefined manner, and the reproduction arrangement is further provided for converting the trigger information into a predetermined output.

The known reproduction arrangement described in the opening paragraph produces a predetermined output if information satisfying a certain standard is fed. If this information does not satisfy this certain standard, the output is generally undefined or the output is not generated. According to the invention the reproduction arrangement contains special information that does not satisfy the standard, but does satisfy a predetermined specification. This specification is only known to the producer of the hardware and/or software that is present in the reproduction arrangement. The reproduction arrangement is further arranged so that it nevertheless produces defined output if this special information is fed. By utilizing the reproduction arrangement in a normal fashion and not dismounting same with means of special tools, the manufacturer can very easily verify whether the reproduction arrangement according to the invention comprises hardware and/or software made by the manufacturer. If the defined output is reproduced if this special information is supplied, the reproduction arrangement comprises the manufacturer's hardware and/or software.

It is observed that the trigger information, for producing a predetermined output, is known per se with the so-called Easter Eggs. Software developers provide their software with a certain functionality which is only be executed if a secret combination of keys, mouse clicks or commands is used. This functionality usually consists of showing messages, animations or effects. These Easter Eggs, however, only occur in software which is installed in computers; then these messages, animations or effects are done full justice. Furthermore, combinations of key strokes, mouse clicks or commands are not bound by a certain standard, whereas the described system just has a standard as a condition. So this solution does not seem right suitable the problem as described earlier.

It is a further object of the invention to provide a transmission arrangement as defined in the opening paragraph. Since the reproduction arrangement according to the invention also receives and decodes trigger information, it is advantageous to provide a possibility of also producing this trigger information. For this purpose, the transmission arrangement according to the invention is characterized in that the transmission arrangement is further provided for transforming a predetermined input into the trigger information and transmitting the trigger information.

It is a further object of the invention to provide a method of reproducing coded information, which method comprises the following steps:

receiving information coded according to a predefined standard, decoding the received coded information for the formation of decoded information, converting the decoded information into an output, characterized in that the method further comprises the following steps:

receiving and decoding trigger information that deviates from the standard in a predetermined manner, converting the trigger information into a predefined output.

It is a further object of the invention to provide a method of forming and transmitting coded information, which method comprises the following steps:

coding the input for forming coded information, transmitting the coded information, characterized in that the method further comprises the following steps:

converting a predefined input into trigger information and transmitting the trigger information.

It is observed that coding or decoding, respectively, is not only meant to be understood as intricate operations according to certain algorithms or standards such as, for example, MPEG coding, but also a simpler operation such as digitization of information.

These and other aspects of the invention are apparent from and will be elucidated with reference to the embodiments described hereinafter.

DETAILED DESCRIPTION OF THE INVENTION

Figure 1:
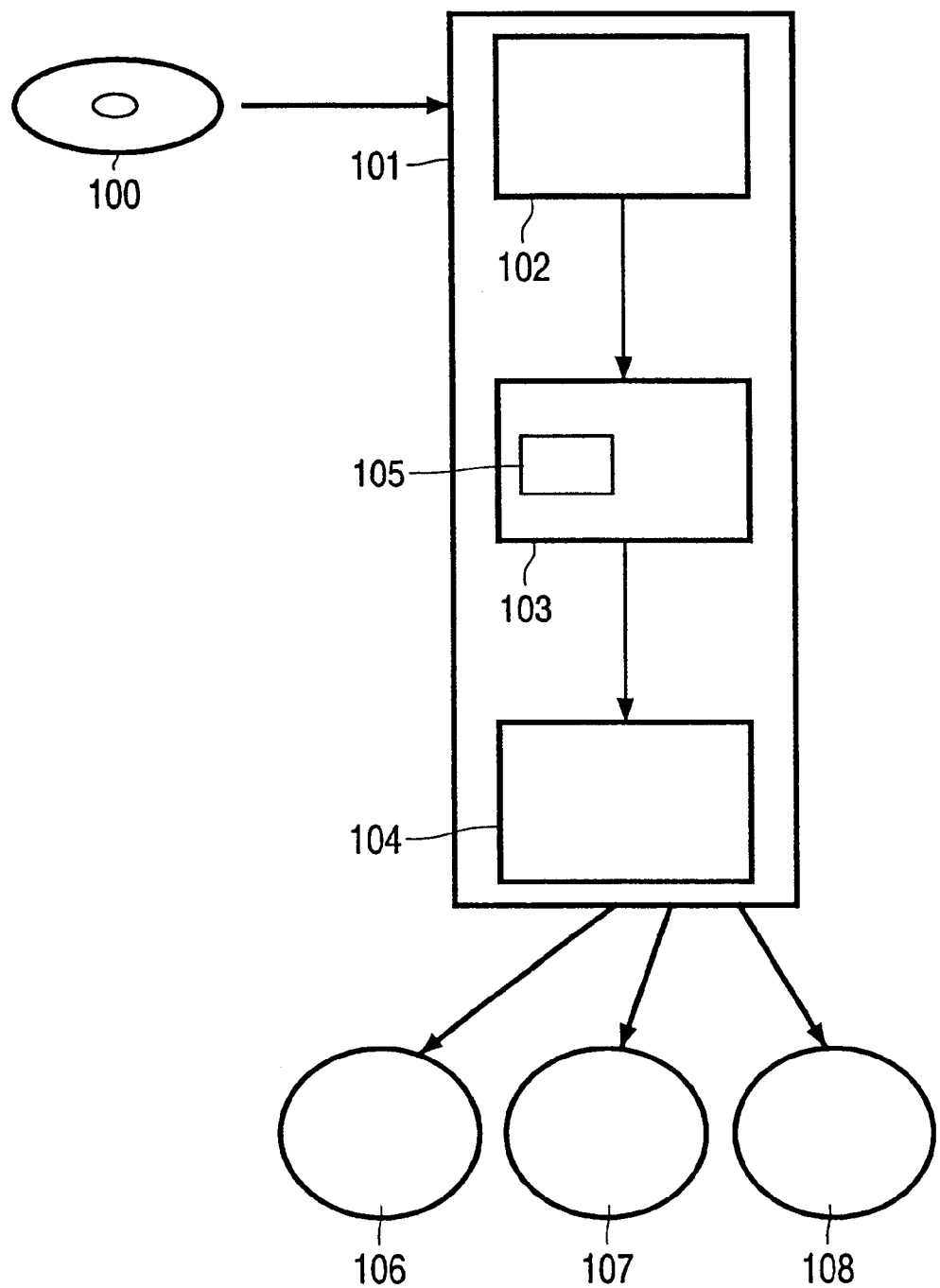
FIG. 1 shows an example of embodiment of a reproduction arrangement according to the invention.

FIG. 1 shows an example of a reproduction arrangement 101 according to the invention, to which an information carrier 100 such as, for example, a CD, superAudio CD, DVD, miniDisc is fed. This reproduction arrangement 101 is arranged so that it:

converts standardized information present on an information carrier 100 into a predetermined first output 106, converts trigger information present on the information carrier 100 into a predetermined second output 107.

Once the information carrier 100 is inserted into the reproduction arrangement 101, a receiving arrangement 102 reads the information from the information carrier 100 and passes it on to a decoding arrangement 103.

The decoding arrangement 103 decodes this information. If the information corresponds to the standard, the decoded information, after decoding, is passed on to a reproduction means 104. The reproduction means 104 converts the decoded information into a defined first output 106. If the information does not correspond to the standard, the information is passed on to a sub-system 105 in the decoding arrangement 103, which decodes the information, possibly in accordance with a predefined specification. This specification is only known to the producer of the hardware and/or software that is available in the system. Now too the decoded information is passed on after decoding to the reproduction means 104. The reproduction means 104 converts the decoded information into a defined second output 107 or into a defined third output 108, depending on whether the information on the information carrier 100 is trigger information or information that neither meets the standard nor is trigger information. The third output 108 is generated, for example, if the reproduction arrangement 101 is arranged indeed for reading, decoding and reproducing the trigger information contents of an information carrier 100, but the information does not meet the predefined standard and is thus no trigger information. The first output 106, the second output 107 and the third output 108 may have, for example, the form of image and/or sound.

The output 106, 107 or 108 may be checked by means of human senses but may also be checked by utilizing special equipment comparing, for example, input and output with each other. The other option is that in the reproduction arrangement 101 a check is made of the decoded information that is passed on to the reproduction means 104. If this information meets neither the standard nor the predefined specification, the decoded information is not passed on to the reproduction means 104 at all and no output is produced.

Figure 2:
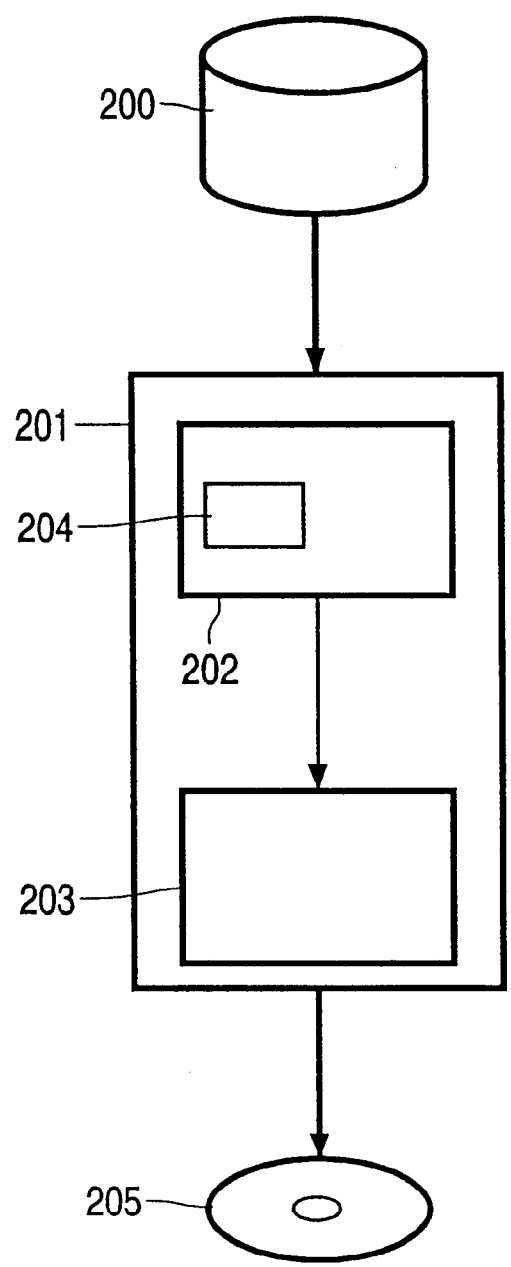
FIG. 2 shows an example of embodiment of a transmission arrangement according to the invention.

FIG. 2 shows an example of a transmission arrangement 201. The transmission arrangement 201 receives input 200. This input 200 is converted into coded information by a coding arrangement 202. The transmission arrangement 201 largely corresponds to a transmission arrangement according to the standard mentioned earlier. But, it is arranged so that predefined input is converted by a sub-system 204 of the coding arrangement 202 not into coded information corresponding to the standard, but that this input is converted into coded information corresponding to a predefined specification. This specification is only known to the producer of the hardware and/or software that is available in the system. Finally, the coded information is passed on to a transmitting means 203. This transmitting means 203 is arranged for writing the coded information on an information carrier 205.

Figure 3:
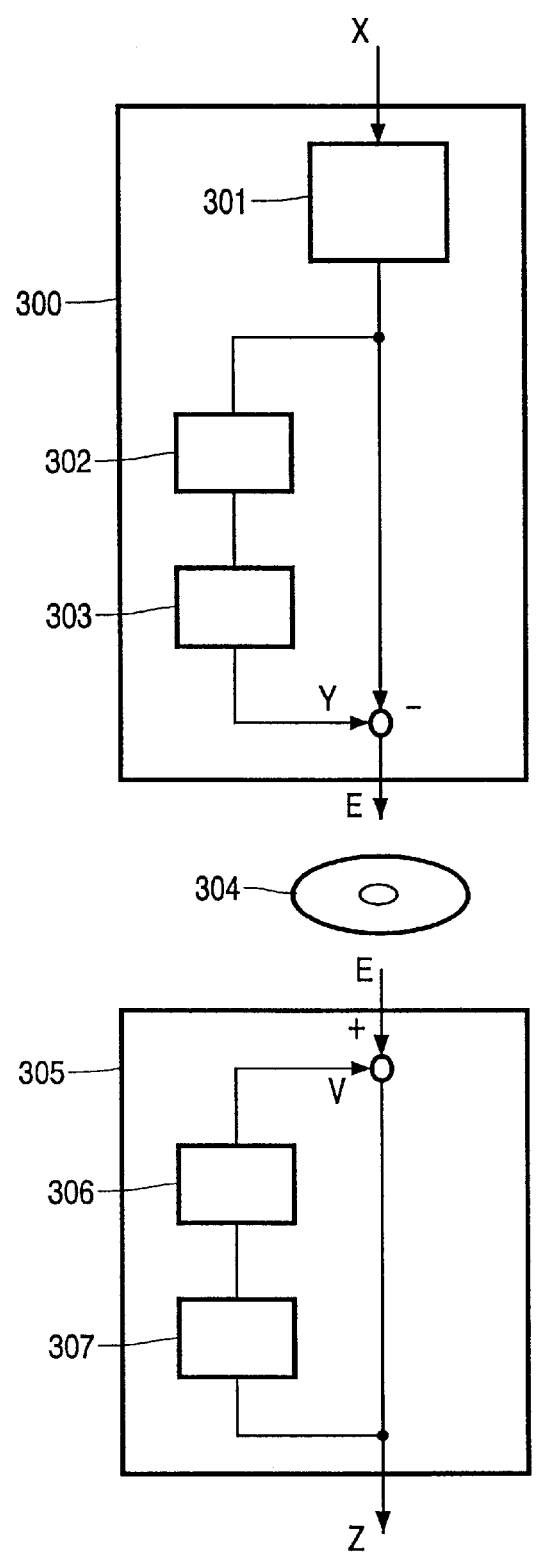
FIG. 3 shows a number of details of a reproduction arrangement and a transmission arrangement according to the invention.

FIG. 3 shows a number of details of a system according to the invention in which a decoding arrangement 305 and a coding arrangement 300 are given in more detail. For simplicity, the transmission arrangement, the receiving arrangement and the transmitting means are omitted. Characteristic features of these means are stated in the descriptions of FIGS. 1 and 2.

An input signal X is read by a selection means 301. Subsequently, this signal is split off and the split-off signal part is sent through a delay element 302 and a filter 303. After delay and filtering, the input signal X thus results in a signal Y. The filter 303 may be set in three ways according to a predefined standard. Which setting is used is determined by the selection means 301. This setting is also written on the information carrier. According to the invention the filter 303 is arranged so that it may also be set in a fourth way. The various settings of the filter 303 may be diagrammatically shown in the Table below. The filter numbers 00, 01 and 10 are only possible according to the standard and the filter number 11 according to the predefined specification.

TABLE 1

| Filter number | Setting |
|---|---|
| 00 | Setting 1 |
| 01 | Setting 2 |
| 10 | Setting 3 |
| 11 | Setting 4 |

Finally, the input signal X and the output signal Y which leaves the filter 303 are subtracted from each other. This results in a signal E. The signal E is finally written on the information carrier 304 together with the filter number.

For decoding the information on the information carrier 304, a decoding arrangement 305 may be used. The decoding arrangement 305 has signal E for its input signal. This signal E is added to a signal V developed from splitting off the output signal Z and subsequently passing the output signal Z through a delay 307 and a filter 306. This filter 306 is the same as the filter 303. The setting of the filter 306 is determined by the filter number which is also present on the information carrier 304.

If the information carrier 304 contains trigger information and thus contains the filter number 11, the decoding arrangement 305, which is arranged in accordance with the invention, will be able to produce the output signal Z. The output signal Z is then equal to the input signal X. The producer of the decoding arrangement 305 can thus ascertain that the decoding arrangement 305 comprises hardware/software produced by himself.

If the information carrier 304 contains information that satisfies the standard and the information thus contains a filter number 00, 01 or 10, the decoding arrangement 305 in which the filter 306 can be set in 4 ways, can produce the output signal Z. The output signal Z is again equal to the input signal X. The reproduction arrangement arranged according to the invention may thus also reproduce information that satisfies the standard.

If, however, the decoding arrangement 305 is exclusively arranged according to the standard, and the filter 306 can thus be set only in 3 ways, and the information carrier 304 contains trigger information, the decoding arrangement 305 will produce an output signal Z that is unequal to the signal X since the correct settings of the filter 306 are not known. The filter 306 is arranged so that if certain settings are not known, other settings may be used which are. In the latter case, for example the settings of filter number 10 are used in lieu of the unknown settings of filter number 11.

In examples of embodiment mentioned above, systems are described which include an information carrier. The information that is used as input for the reproduction arrangement of the system may also be supplied in a different manner. Examples hereof are:

- a television receiver, which has an antenna signal for its input. An antenna may then be arranged as a receiving arrangement;
- a video recorder, which has an antenna signal for its input. An antenna may then be arranged as a receiving arrangement;
- a PC application, which has a file for its input, possibly present on a hard disk or obtained from the Internet. A hard disk may then be arranged as a receiving arrangement.

What is claimed is:

1. A method for determining whether coded information recorded on an information carrier corresponds either to a first code indicative of one of a plurality of predetermined standards, or to a second code indicative of a predefined specification confirming the genuineness of the information, or does not correspond to either, said method comprising the steps of:

reading the information from said information carrier;

decoding said information;

producing a first output signal in response to detecting said first code; and producing a second output signal in response to detecting said second code in the absence of said first code.

2. The method of claim 1, further including the step of:

producing a third output signal in response to detecting the absence of said first and second codes.

3. The method of claim 1, further including the step of:

forming said first and second output signals as images and/or sound.

4. The method of claim 2, further including the step of:

forming said first, second, and third output signals as images and/or sound.

5. The method of claim 1, further including the step of:

preventing the reproduction of the decoded information in response to the absence of either one of said first and second codes.

6. A reproduction arrangement for reproducing coded information recorded on an information carrier, comprising:

receiving means for reading the coded information from said information carrier;

a decoding arrangement for receiving the coded information from said receiving means, said decoding arrangement including:

first decoding means for decoding and detecting if present a first code indicative of the decoded information corresponding to one of a plurality of predetermined standards; and second decoding means responsive to the absence of said first code for decoding and detecting if present a second code indicative of the decoded information corresponding to a predetermined specification associated with the genuineness of the information; and reproduction means responsive to either said first decoding means detecting the first code, for producing a first output, or to said second decoding means detecting the second code, for producing a second output.

7. The reproduction arrangement of claim 6, wherein said reproduction means further includes means responsive to the absence of the detection of the first and second codes by said first and second decoding means, for producing a third output.

8. The reproduction arrangement of claim 6, wherein said reproduction means further includes means for forming either one of said first and second outputs as images and/or sound outputs.

9. The reproduction arrangement of claim 6, wherein said reproduction means further includes means responsive to the absence of either one of said first and second codes for preventing the outputting of decoded information.

10. A method for encoding information onto an information carrier, and decoding and playing back the information, comprising the steps of:

receiving an input signal including information to be encoded:

selectively encoding said information either into a first code indicative of one of a plurality of predetermined standards, or into a second code corresponding to a predefined specification confirming the genuineness of the information; and writing the encoded information onto an information carrier wherein said step of selectively encoding includes the steps of:

splitting said input signal into first and second signals;

passing said first signal through a delay element;

passing the delayed said first signal through a first filter set to encode the information into either said first code or said second code;

subtracting said second signal from said first signal, for producing a third signal; and recording the third signal on the information carrier.

11. The method of claim 10, further including for decoding the third signal from said information carrier the steps of:

reading said third signal from said information carrier;

splitting off a fourth signal from an output signal of an associated decoder;

passing said fourth signal through a delay element;

passing the delayed fourth signal through a second filter identical to said first filter, and having the same setting as said first filter; and adding the filtered and delayed fourth signal to said third signal, for producing said output signal representing the decoded said third signal.

* * * * *